United States Patent
Nishimura

(10) Patent No.: US 12,247,120 B2
(45) Date of Patent: Mar. 11, 2025

(54) SURFACE SKIN, METHOD OF PRODUCING SURFACE SKIN, AND LAMINATE

(71) Applicant: ZEON CORPORATION, Tokyo (JP)

(72) Inventor: Shota Nishimura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 957 days.

(21) Appl. No.: 16/980,846

(22) PCT Filed: Mar. 18, 2019

(86) PCT No.: PCT/JP2019/011264
§ 371 (c)(1),
(2) Date: Sep. 15, 2020

(87) PCT Pub. No.: WO2019/188520
PCT Pub. Date: Oct. 3, 2019

(65) Prior Publication Data
US 2021/0017373 A1    Jan. 21, 2021

(30) Foreign Application Priority Data
Mar. 28, 2018 (JP) ................................ 2018-062873

(51) Int. Cl.
| | | |
|---|---|---|
| *C08L 27/06* | (2006.01) | |
| *B32B 5/18* | (2006.01) | |
| *B32B 27/22* | (2006.01) | |
| *B32B 27/30* | (2006.01) | |
| *B32B 27/40* | (2006.01) | |
| *C08K 5/00* | (2006.01) | |
| *C08K 5/23* | (2006.01) | |
| *C08L 75/04* | (2006.01) | |

(52) U.S. Cl.
CPC ............... *C08L 27/06* (2013.01); *B32B 5/18* (2013.01); *B32B 27/22* (2013.01); *B32B 27/304* (2013.01); *B32B 27/40* (2013.01); *C08K 5/0016* (2013.01); *C08K 5/23* (2013.01); *C08L 75/04* (2013.01); *B32B 2250/03* (2013.01); *B32B 2266/0278* (2013.01); *B32B 2305/022* (2013.01); *B32B 2327/06* (2013.01); *B32B 2375/00* (2013.01); *B32B 2605/003* (2013.01); *C08L 2203/14* (2013.01)

(58) Field of Classification Search
CPC ...... C08L 27/06; C08L 75/04; C08L 2203/14; C08L 2205/025; C08L 27/16; B32B 5/18; B32B 27/22; B32B 27/304; B32B 27/40; B32B 2250/03; B32B 2266/0278; B32B 2305/022; B32B 2327/06; B32B 2375/00; B32B 2605/003; B32B 5/20; B32B 5/32; B32B 27/065; B32B 27/08; B32B 27/20; B32B 2266/0242; B32B 2266/0235; B32B 2307/536; B32B 2307/732; B32B 2307/736; C08K 5/0016; C08K 5/23; C08K 5/12; C08K 5/1515; C08J 9/36; C08J 9/103; C08J 2327/06; C08J 2427/06
USPC ....................................................... 428/424.6
See application file for complete search history.

(56) References Cited

U.S. PATENT DOCUMENTS

| | | | |
|---|---|---|---|
| 4,176,210 A * | 11/1979 | Skinner | B44C 3/044 427/407.1 |
| 4,510,201 A | 4/1985 | Takeuchi et al. | |
| 5,395,580 A | 3/1995 | Morita et al. | |
| 5,677,356 A | 10/1997 | Shimizu et al. | |
| 2002/0025751 A1 | 2/2002 | Chen et al. | |
| 2016/0347932 A1* | 12/2016 | Nishimura | B29C 41/18 |

FOREIGN PATENT DOCUMENTS

| | | |
|---|---|---|
| JP | S57003846 A * | 1/1982 |
| JP | H03262750 A | 11/1991 |
| JP | H06297624 A | 10/1994 |
| JP | H07228615 A | 8/1995 |
| JP | H07258448 A | 10/1995 |
| JP | 2011173974 A | 9/2011 |
| JP | 2012007026 A | 1/2012 |
| WO | 2016098344 A1 | 6/2016 |

OTHER PUBLICATIONS

Machine translation of JP S57-003846 A (Year: 1982).*
Machine translation of JP H06-297624 A (Year: 1994).*
Sep. 29, 2020, International Preliminary Report on Patentability issued in the International Patent Application No. PCT/JP2019/011264.
Nov. 22, 2021, the Extended European Search Report issued by the European Patent Office in the corresponding European Patent Application No. 19774975.7.
Jun. 11, 2019, International Search Report issued in the International Patent Application No. PCT/JP2019/011264.
Polyvinyl Chloride, edited by the Division of Polymer Sciences, Oct. 25, 1988, pp. 75-104.

* cited by examiner

*Primary Examiner* — Callie E Shosho
*Assistant Examiner* — Steven A Rice
(74) *Attorney, Agent, or Firm* — KENJA IP LAW PC

(57) ABSTRACT

Disclosed is a surface skin which comprises a vinyl chloride resin molded sheet (X) which comprises a vinyl chloride resin and a plasticizer; and a foamed vinyl chloride resin molded sheet (Y), wherein an amount of the plasticizer contained in the vinyl chloride resin molded sheet (X) is 50 parts by mass or more per 100 parts by mass of the vinyl chloride resin, and the foamed vinyl chloride resin molded sheet (Y) is disposed on one side in a thickness direction of the vinyl chloride resin molded sheet (X).

7 Claims, No Drawings

SURFACE SKIN, METHOD OF PRODUCING SURFACE SKIN, AND LAMINATE

TECHNICAL FIELD

The present disclosure relates to a surface skin, a method of producing a surface skin, and a laminate.

BACKGROUND

Vinyl chloride resins are generally used in various applications for their excellent properties such as cold resistance, heat resistance, and oil resistance.

Specifically, for example, surface skins formed of a vinyl chloride resin molded product obtained by molding a vinyl chloride resin composition into a sheet (hereinafter also referred to as a "vinyl chloride resin molded sheet"), laminates in which a surface skin formed of such a vinyl chloride resin molded sheet is lined with a foamed polyurethane or other foam have heretofore been used as automobile interior materials for forming automobile interior components such as automobile instrument panels.

Materials for vinyl chloride resin molded sheets which have been used in the art include vinyl chloride resin compositions which comprise a vinyl chloride resin and a plasticizer (see, e.g., PTL 1 and PTL 2).

CITATION LIST

Patent Literature

PTL 1: JP2011173974A
PTL 2: JP2012007026A

SUMMARY

Technical Problem

Plasticizers have been commonly used in the art for the purpose of improving the flexibility or other properties of vinyl chloride resin molded sheets. However, a surface skin formed of a vinyl chloride resin molded sheet containing a plasticizer has the problem of poor appearance as an automobile interior material because it shrinks under high temperature conditions when it is used after lined with a foam such as a foamed polyurethane molded product. Hence, there is need in the art to reduce the thermal shrinkage of a surface skin that occurs when it is used after lined with a foamed polyurethane molded product.

Accordingly, an object of the present disclosure is to provide a surface skin which can favorably reduce the thermal shrinkage when it is used after lined with a foamed polyurethane molded product.

Another object of the present disclosure is to provide a laminate which comprises the surface skin and can favorably reduce thermal shrinkage.

Solution to Problem

The inventor conducted diligent investigation with the aim of solving the problem set forth above. The inventor established that a surface skin which comprises a foamed vinyl chloride resin molded sheet disposed on one side in the thickness direction of a vinyl chloride resin molded sheet containing a plasticizer can favorably reduce thermal shrinkage when it is used after lined with a foamed polyurethane molded product. The inventor thus completed the present disclosure.

Namely, the present disclosure aims at advantageously solving the problem set forth above, and the presently disclosed surface skin comprises: a vinyl chloride resin molded sheet (X) which comprises a vinyl chloride resin and a plasticizer; and a foamed vinyl chloride resin molded sheet (Y), wherein an amount of the plasticizer contained in the vinyl chloride resin molded sheet (X) is 50 parts by mass or more per 100 parts by mass of the vinyl chloride resin, and the foamed vinyl chloride resin molded sheet (Y) is disposed on one side in a thickness direction of the vinyl chloride resin molded sheet (X). With such a surface skin which comprises a foamed vinyl chloride resin molded sheet disposed on one side in the thickness direction of a vinyl chloride resin molded sheet containing a plasticizer, thermal shrinkage that occurs when the surface skin is used after lined with a foamed polyurethane molded product can be favorably reduced.

In the presently disclosed surface skin, it is preferred that the foamed vinyl chloride resin molded sheet (Y) has a thickness of 1.5 mm or more. When the thickness of the vinyl chloride resin molded sheet (Y) is 1.5 mm or more, thermal shrinkage that occurs when the surface skin is used after lined with a foamed polyurethane molded product can be more favorably reduced.

The thickness of the foamed vinyl chloride resin molded sheet (Y) herein can be measured with an optical microscope.

In the presently disclosed surface skin, it is preferred that the foamed vinyl chloride resin molded sheet (Y) comprises an acrylic polymer. When the foamed vinyl chloride resin molded sheet (Y) comprises an acrylic polymer, the hardness of the surface skin can be reduced.

In the presently disclosed surface skin, it is preferred that the acrylic polymer comprises a copolymer of a methacrylic acid alkyl ester and an acrylic acid alkyl ester. When the acrylic polymer the acrylic polymer contains a copolymer of a methacrylic acid alkyl ester and an acrylic acid alkyl ester, the hardness of the surface skin can be further reduced.

It is preferred that the presently disclosed surface skin is for an automobile interior component. When the presently disclosed surface skin is used for an automobile interior component, thermal shrinkage that occurs when the surface skin is used after lined with a foamed polyurethane molded product can be favorably reduced to thereby prevent degradation of the surface skin.

The presently disclosed method of producing a surface skin is a method of producing a surface skin which comprises a vinyl chloride resin molded sheet (X) and a foamed vinyl chloride resin molded sheet (Y), wherein the method comprises: a first step of forming the vinyl chloride resin molded sheet (X) using a vinyl chloride resin composition (A) which comprises a vinyl chloride resin and a plasticizer; and a second step of forming the foamed vinyl chloride resin molded sheet (Y) on one side in a thickness direction of the vinyl chloride resin molded sheet (X) using a foamable vinyl chloride resin composition (B), wherein an amount of the plasticizer contained in the vinyl chloride resin composition (A) is 50 parts by mass or more per 100 parts by mass of the vinyl chloride resin. When the step of forming a vinyl chloride resin molded sheet using a vinyl chloride resin composition (A) containing a vinyl chloride resin and a plasticizer, and the step of forming a foamed vinyl chloride resin molded sheet (Y) on one side in the thickness direction of the vinyl chloride resin molded sheet (X) using a foamable vinyl chloride resin composition (B) are performed as described above, it is possible to produce a surface skin which can favorably reduce thermal shrinkage that occurs when it is used after lined with a foamed polyurethane molded product.

In the presently disclosed method of producing a surface skin, it is preferred that the foamable vinyl chloride resin composition (B) comprises a thermally decomposable foaming agent. When the foamable vinyl chloride resin composition (B) comprises a thermally decomposable foaming agent, thermal shrinkage that occurs when the surface skin is used after lined with a foamed polyurethane molded product can be more favorably reduced.

In the presently disclosed method of producing a surface skin, it is preferred that the thermally decomposable foaming agent comprises an azo compound. When the thermally decomposable foaming agent comprises an azo compound, thermal shrinkage that occurs when the surface skin is used after lined with a foamed polyurethane molded product can be more favorably reduced.

In the presently disclosed method of producing a surface skin, it is preferred that the thermally decomposable foaming agent has a volume-average particle diameter of 10 μm or less. When the volume-average particle diameter of the thermally decomposable foaming agent is 10 μm or less, the hardness of the obtained surface skin can be reduced to improve the cushioning property.

The present disclosure aims at advantageously solving the problem set forth above, and the presently disclosed laminate comprises: a foamed polyurethane molded product; and any one of the surface skins described above, wherein the foamed vinyl chloride resin molded sheet (Y) is disposed between the foamed polyurethane molded product and the vinyl chloride resin molded sheet (X). With such a laminate which comprises a foamed polyurethane molded product and any of the surface skins described above with the foamed vinyl chloride resin molded sheet (Y) being disposed between the foamed polyurethane molded product and the vinyl chloride resin molded sheet (X), thermal shrinkage can be favorably reduced.

Advantageous Effect

According to the present disclosure, it is possible to provide a surface skin which can favorably reduce thermal shrinkage when it is used after lined with a foamed polyurethane molded product.

According to the present disclosure, it is also possible to provide a laminate which can favorably reduce the thermal shrinkage of a surface skin.

DETAILED DESCRIPTION

The following provides a detailed description of embodiments of the present disclosure.

The presently disclosed surface skin can be used for example for the production of the presently disclosed laminate. The presently disclosed surface skin can be suitably used for example as an automobile interior material, e.g., a surface skin of an automobile interior component such as an automobile instrument panel. The presently disclosed surface skin can be produced by the presently disclosed method of producing a surface skin.

(Surface Skin)

The presently disclosed surface skin comprises: a vinyl chloride resin molded sheet (X) containing a vinyl chloride resin and a predetermined amount of a plasticizer; and a foamed vinyl chloride resin molded sheet (Y), wherein the foamed vinyl chloride resin molded sheet (Y) is disposed on one side in the thickness direction of the vinyl chloride resin molded sheet (X). Because the foamed vinyl chloride resin molded sheet (Y) is disposed on one side in the thickness direction of the vinyl chloride resin molded sheet (X), thermal shrinkage of the presently disclosed surface skin can be favorably reduced when it is used after lined with a foamed polyurethane molded product, i.e., when a foamed polyurethane molded product is further laminated on the side on which the vinyl chloride resin molded sheet (Y) is disposed. Thus, the presently disclosed surface skin is suitably used as an automobile interior member, more specifically, for example, as a surface skin of an automobile interior component such as an automobile instrument panel and a door trim, and is particularly suitably used for a surface skin of an automobile instrument panel.

<Vinyl Chloride Resin Molded Sheet (X)>

The vinyl chloride resin molded sheet (X) is obtained by shaping a vinyl chloride resin composition (A) containing a vinyl chloride resin and a predetermined amount of a plasticizer into sheet form. Usually, the vinyl chloride resin molded sheet (X) is not foamed as opposed to the foamed vinyl chloride resin molded sheet (Y) described later.

The thickness of the vinyl chloride resin molded sheet (X) is not particularly limited, but is preferably 0.1 mm or more, more preferably 0.5 mm or more, still more preferably 0.7 mm or more, even more preferably 1.0 mm or more, and further more preferably 1.2 mm or more, but preferably 5.0 mm or less, more preferably 2.0 mm or less, still more preferably 1.8 mm or less, and even more preferably 1.5 mm or less. When the thickness of the vinyl chloride molded resin sheet (X) is not less than the above-mentioned lower limit, it is possible to impart good tensile elongation at low temperatures to the obtained vinyl chloride molded resin sheet (X). When the thickness of the vinyl chloride resin molded sheet (X) is not greater than the above upper limit, the obtained vinyl chloride resin molded sheet (X) is excellent in handleability and also it is possible to more easily dispose the foamed vinyl chloride resin molded sheet (Y) on the vinyl chloride resin molded sheet (X).

<<Vinyl Chloride Resin Composition (A)>>

The vinyl chloride resin composition (A) comprises a vinyl chloride resin and a predetermined amount of a plasticizer and may optionally further comprise various additives and the like.

Except for those components which may be decomposed in the molding step, the amounts of components in the vinyl chloride resin composition (A) relative to the vinyl chloride resin equal to their amounts in the vinyl chloride resin molding sheet (X).

[Vinyl Chloride Resin]

The vinyl chloride resin included in the vinyl chloride resin composition (A) can comprise one or more types of vinyl chloride resin particles, and can optionally further comprise one or more types of vinyl chloride resin fine particles. Preferably, the vinyl chloride resin comprises at least vinyl chloride resin particles, and more preferably comprises vinyl chloride resin particles and vinyl chloride resin fine particles.

The term "resin particles" as used herein refers to particles with a particle diameter of 30 mm or more, and the term "resin fine particles" as used herein refer to particles with a particle diameter of less than 30 mm. Vinyl chloride resin particles usually function as a matrix resin (base material) and vinyl chloride resin fine particles usually function as a dusting agent (powder fluidity improver). Vinyl chloride resin particles are preferably produced by suspension polymerization, and vinyl chloride resin fine particles are preferably produced by emulsion polymerization.

The vinyl chloride resin can be produced by any of the production methods known in the art such as, for example, suspension polymerization, emulsion polymerization, solution polymerization, or bulk polymerization.

—Chemical Composition—

Examples of vinyl chloride resins include homopolymers consisting of a vinyl chloride monomer unit, and vinyl chloride copolymers containing a vinyl chloride monomer unit in an amount of preferably 50% by mass or more, and more preferably 70% by mass or more. Examples of monomers (comonomers) which can be copolymerized with vinyl chloride monomers to constitute vinyl chloride copolymers include olefins such as ethylene and propylene; olefin halides such as allyl chloride, vinylidene chloride, vinyl fluoride, and ethylene trifluoride; carboxylic acid vinyl esters such as vinyl acetate and vinyl propionate; vinyl ethers such as isobutyl vinyl ether, and cetyl vinyl ether; allyl ethers such as allyl-3-chloro-2-oxypropyl ether and allyl glycidyl ether; unsaturated carboxylic acids, and esters and acid anhydrides thereof, such as acrylic acid, maleic acid, itaconic acid, 2-hydroxyethyl acrylate, methyl methacrylate, monomethyl maleate, diethyl maleate, and maleic anhydride; unsaturated nitriles such as acrylonitrile and methacrylonitrile; acrylamides such as acrylamide, N-methylolacrylamide, acrylamido-2-methylpropanesulfonic acid, and (meth)acrylamidopropyltrimethylammonium chloride; and allylamines and derivatives thereof, such as allylamine benzoate and diallyldimethylammonium chloride. The above examples of monomers are only some of the comonomers that can be used herein. Further examples of comonomers that can be used herein include various monomers described on pages 75-104 of "Polyvinyl Chloride" edited by the Vinyl Section of the Kinki Chemical Society Japan and published by Nikkan Kogyo Shimbun, Ltd. (1988). Only one type alone or two or more types of may be used in combination as such comonomers. The above-described vinyl chloride resin also includes those obtained by graft-polymerizing ethylene-vinyl acetate copolymers, ethylene-methyl methacrylate copolymers, ethylene-ethyl acrylate copolymers, chlorinated polyethylene or other resins with either (1) vinyl chloride or (2) vinyl chloride and the co-monomer(s).

The term "(meth)acryl" as used herein means acryl and/or methacryl.

[Plasticizer]

The vinyl chloride resin composition (A) further comprises a predetermined amount of a plasticizer. If the vinyl chloride resin composition does not comprise a plasticizer, it is not possible to favorably obtain a vinyl chloride resin molded sheet by the use of the vinyl chloride resin composition.

—Amount—

The plasticizer content needs to be 50 parts by mass or more per 100 parts by mass of the vinyl chloride resin, preferably 55 parts by mass or more, more preferably 60 parts by mass or more, still more preferably 65 parts by mass or more, even more preferably 70 parts by mass or more, and further preferably 85 parts by mass or more, but preferably 200 parts by mass or less, more preferably 170 parts by mass or less, still more preferably 140 parts by mass or less, and even more preferably 100 parts by mass or less. When the plasticizer content is not less than the above lower limit, it is possible to impart excellent flexibility to the vinyl chloride resin composition (A), so that the composition can be easily formed into the vinyl chloride resin molded sheet (X) and also a good tensile elongation at low temperatures can be imparted to the obtained vinyl chloride resin molded sheet (X). When the plasticizer content is not greater than the above upper limit, it is possible to further reduce the stickiness on the surface of the obtained vinyl chloride resin molded sheet (X) to further increase the surface slipperiness.

—Type—Primary and secondary plasticizers described in WO2016/098344 can be used, for example. As the plasticizer, one type alone or two or more types may be used in combination at any desired ratio.

From the viewpoint that a favorable vinyl chloride resin composition (A) and a favorable vinyl chloride resin molded sheet (X) can be easily obtained, preferably, at least a primary plasticizer is used, and more preferably, primary and secondary plasticizers are used in combination. Specifically, a trimellitic acid ester and/or a pyromellitic acid ester are/is preferably used. More preferably, at least a trimellitic acid ester is used, and still more preferably, a combination of a trimellitic acid ester and an epoxidized soybean oil is used.

[Additives]

In addition to the components described above, the vinyl chloride resin composition (A) may further comprise various additives. Additives are not particularly limited and examples thereof include stabilizers such as perchloric acid-treated hydrotalcite, zeolite, β-diketones, and fatty acid metal salts; mold release agents; dusting agents other than the vinyl chloride resin fine particles described above; impact resistance improvers; perchloric acid compounds other than perchloric acid-treated hydrotalcite (e.g., sodium perchlorate, potassium perchlorate); antioxidants; antifungal agents; flame retardants; antistatic agents; fillers; light stabilizers; moldability regulators (e.g., silicone oils); and colorants.

Such additives are not particularly limited. For example, those described in WO2016/098344 (except for foaming agents) can be used.

[Method of Preparing Vinyl Chloride Resin Composition (A)]

Methods of preparing the vinyl chloride resin composition (A) are not particularly limited. The vinyl chloride resin composition (A) can be obtained by mixing the components described above.

Methods of mixing the vinyl chloride resin, a predetermined amount of the plasticizer and optional various additives are not particularly limited. An exemplary mixing method involves mixing components, other than the dusting agent containing vinyl chloride resin fine particles, by dry blending, followed by addition and mixing of the dusting agent. Dry blending is preferably carried out using HENSCHEL MIXER. The temperature during dry blending is not particularly limited but is preferably 50° C. or higher, and more preferably 70° C. or higher, but preferably 200° C. or lower.

<Foamed Vinyl Chloride Resin Sheet (Y)>

The presently disclosed surface skin has a foamed vinyl chloride resin molded sheet (Y) disposed on one side in the thickness direction of the vinyl chloride resin molded sheet (X). Preferably, the foamed vinyl chloride resin molded sheet (Y) is positioned on the surface on one side in the thickness direction of the presently disclosed surface skin. A part or entire of the surface on one side in the thickness direction of the presently disclosed surface skin may be composed of the foamed vinyl chloride resin molded sheet (Y).

It is generally considered that when a surface skin formed of a vinyl chloride resin molded sheet containing a plasticizer is placed for example under a high temperature condition while being in direct contact with a foamed urethane molded product, the plasticizer in the surface skin migrates to the foamed urethane molded product, so that the amount of the plasticizer in the surface skin decreases to cause thermal shrinkage of the surface skin. In contrast, in the presently disclosed surface skin in which the foamed vinyl chloride resin molded sheet (Y) is disposed on one side in the thickness direction of the vinyl chloride resin molded sheet (X) containing a plasticizer, the foamed vinyl chloride resin molded sheet (Y) is interposed between the vinyl chloride resin molded sheet (X) and the foamed urethane molded product. It is presumed that this configuration makes it difficult for the plasticizer to migrate from the vinyl chloride resin molded sheet (X) and the foamed vinyl chloride resin molded sheet (Y) to the foamed urethane molded product and as a consequence can favorably reduce the thermal shrinkage of the surface skin.

The foamed vinyl chloride resin molded sheet (Y) may be directly bonded to the vinyl chloride resin molded sheet (X). Alternatively, as long as a desired effect is obtainable, the foamed vinyl chloride resin molded sheet (Y) may be bonded to the vinyl chloride resin molded sheet (X) with other resin layer(s) or the like being interposed between the foamed vinyl chloride resin molded sheet (Y) and the vinyl chloride resin molded sheet (X). However, it is preferred that the foamed vinyl chloride resin molded sheet (Y) is directly bonded to the vinyl chloride resin molded sheet (X) from the viewpoint of further favorably reducing thermal shrinkage when the surface skin is used after lined with a foamed urethane molded product.

The thickness of the foamed vinyl chloride resin molded sheet (Y) is not particularly limited, but is preferably 1.5 mm or more, more preferably 1.8 mm or more, still more preferably 2.0 mm or more, even more preferably 2.3 mm or more, and further more preferably 2.5 mm or more, but preferably 10.0 mm or less, more preferably 5.0 mm or less, still more preferably 4.0 mm or less, even more preferably 3.0 mm or less, and further more preferably 2.7 mm or less. When the thickness of the foamed vinyl chloride resin molded sheet (Y) is not less than the above lower limit, it is possible to further favorably reduce thermal shrinkage when the obtained surface skin is used after lined with a foamed polyurethane molded product and also to reduce the hardness of the surface skin to improve the cushioning property. On the other hand, when the thickness of the foamed vinyl chloride resin molded sheet (Y) is not greater than the above upper limit, the obtained surface skin becomes easy to handle during the procedure for lining the surface skin with a foamed polyurethane molded product.

Methods of obtaining the foamed vinyl chloride resin molded sheet (Y) are not particularly limited. Usually, the foamed vinyl chloride resin molded sheet (Y) is obtained by shaping a foamable vinyl chloride resin composition (B) into sheet form while foaming the composition.

<<Foamable Vinyl Chloride Resin Composition (B)>>

The foamable vinyl chloride resin composition (B) comprises a vinyl chloride resin and a foaming agent, and may optionally further comprise an acrylic polymer, a plasticizer, and other various additives.

The vinyl chloride resin to be included in the foamable vinyl chloride resin composition (B) can be the vinyl chloride resin to be included in the vinyl chloride resin composition (A) described in the section titled "Vinyl Chloride Resin Molded Sheet (X)" above.

The plasticizer which can be included in the foamable vinyl chloride resin composition (B) can be appropriately selected from the plasticizers to be included in the vinyl chloride resin composition (A) described in the section titled "Vinyl Chloride Resin molded Sheet (X)" above. The plasticizer content in the foamable vinyl chloride resin composition (B) is preferably 70 parts by mass or more per 100 parts by mass of the vinyl chloride resin, more preferably 75 parts by mass or more, still more preferably 80 parts by mass or more, even more preferably 85 parts by mass or more, but preferably 200 parts by mass or less, more preferably 170 parts by mass or less, and still more preferably 140 parts by mass or less. When the plasticizer content in the foamable vinyl chloride resin composition (B) is not less than the above lower limit, it is possible to lower the hardness of the surface skin to improve the cushioning property. On the other hand, when the plasticizer content in the foamable vinyl chloride resin composition (B) is not greater than the above upper limit, the foamed vinyl chloride resin molded sheet (Y) does not become too soft, so that the obtained surface skin becomes easy to handle during the procedure for lining the surface skin with a foamed polyurethane molded product.

Various additives other than foaming agents and plasticizers, which may be included in the foamable vinyl chloride resin composition (B), can be the additives which may be included in the vinyl chloride resin composition (A) described in the section titled "Vinyl Chloride Resin Molded Sheet (X)" above.

Except for those components which may be decomposed in the molding step (e.g., thermally decomposable foaming agents described later), the amounts of components in the foamable vinyl chloride resin composition (B) relative to the vinyl chloride resin equal to their amounts in the foamed vinyl chloride resin molding sheet (Y).

[Foaming Agent]

The foamable vinyl chloride resin composition (B) comprises a foaming agent. When the foamable vinyl chloride resin composition (B) comprises a foaming agent, the foamed vinyl chloride resin molded sheet (Y) can be favorably obtained by molding the foamable vinyl chloride resin composition (B) while foaming the composition.

The foaming agent to be included in the foamable vinyl chloride resin composition (B) can be, for example, a chemical foaming agent or a physical foaming agent.

Examples of chemical foaming agents include thermally decomposable foaming agents and reactive foaming agents.

Thermally decomposable foaming agents can be organic thermally decomposable foaming agents such as azo compounds, nitroso compounds, hydrazine derivatives, semicarbazide compounds, tetrazole compounds, and organic acids; or inorganic thermally decomposable foaming agents such as bicarbonates, carbonates, organic acid salts, and nitrites.

Examples of azo compounds include azodicarbonamide (ADCA), azobisisobutyronitrile (AIBN), barium azodicarboxylate, and diazoaminobenzene. Examples of nitroso compounds include dinitrosopentamethylenetetramine (DPT).

Examples of hydrazine derivatives include p,p'-oxybis(benzenesulfonylhydrazide) (OBSH), paratoluenesulfonylhydrazide (TSH), and hydrazodicarbonamide (HDCA).

Examples of semicarbazide compounds include p-toluenesulfonyl semicarbazide. Examples of tetrazole compounds include 5-phenyltetrazole and 1,4-bistetrazole.

Examples of organic acids include polyvalent carboxylic acids such as citric acid, oxalic acid, fumaric acid, phthalic acid, malic acid, and tartaric acid.

Examples of reactive foaming agents include combinations of isocyanate compounds and water, combinations of sodium bicarbonate and acids, combinations of hydrogen peroxide and yeast bacteria, and combinations of zinc powder and acids.

Examples of physical foaming agents include gases such as chlorofluorocarbon gas and carbon dioxide gas; volatile liquids such as water and volatile hydrocarbon compounds; and thermally expandable microcapsules containing these gases, volatile liquids, etc. therein.

Preferred foaming agents are thermally decomposable foaming agents, with azo compounds being more preferred, and azodicarbonamide (ADCA) being particularly preferred. When a thermally decomposable foaming agent is used as the foaming agent, thermal shrinkage of the surface skin that occurs when it is used after lined with a foamed polyurethane molded product can be more favorably reduced, and thermal shrinkage can be further favorably reduced when an azo compound is used.

The volume-average particle diameter of the thermally decomposable foaming agent is preferably 30 µm or less, more preferably 20 µm or less, still more preferably 10 µm or less, even more preferably 7 µm or less, still even more preferably 5 µm or less, further more preferably 4 µm or less, and most preferably 3 µm or less, but preferably 1 µm or more. When the volume-average particle diameter of the thermally decomposable foaming agent is not less than the above upper limit, the expansion ratio of the foamable vinyl chloride resin composition (B) is increased to lower the hardness of the obtained surface skin and improve the cushioning property. On the other hand, when the volume-average particle diameter of the thermally decomposable foaming agent is not greater than the above lower limit, the thermally decomposable foaming agent is easy to handle.

The term "volume-average particle diameter" as used herein refers to a particle diameter (median dimeter), where the cumulative volume from the fine side amounts to 50% of the entire volume in a volume-based particle size distribution measured by a laser diffraction/scattering particle size analyzer.

The amount of the thermally decomposable foaming agent in the foamable vinyl chloride resin composition (B) is preferably 0.7 parts by mass or more per 100 parts by mass of the above vinyl chloride resin, more preferably 1.4 parts by mass or more, and still more preferably 2.1 parts by mass or more, but preferably 4 parts by mass or less. When the amount of the thermally decomposable foaming agent is not less than the above lower limit, the expansion ratio of the foamable vinyl chloride resin composition (B) is increased to lower the hardness of the obtained surface skin and improve the cushioning property. On the other hand, when the amount of the thermally decomposable foaming agent is not greater than the above upper limit, the uniformity of bubbles (cells) is improved, so that the hardness of the obtained surface skin can be lowered substantially uniformly throughout the surface skin, thereby improving the cushioning property.

[Acrylic Polymer]

The foamable vinyl chloride resin composition (B) preferably comprises an acrylic polymer. With an acrylic polymer included in the foamable vinyl chloride resin composition (B), the uniformity of bubbles (cells) in the foamed vinyl chloride resin molded sheet (Y) is improved, so that hardness of the obtained surface skin can be lowered substantially uniformly throughout the surface skin, thereby improving the cushioning property.

The term "acrylic polymer" used herein refers to a polymer containing a structural unit derived from a (meth)acrylic acid ester, such as an acrylic acid alkyl ester, a methacrylic acid alkyl ester, an acrylic acid alkoxyalkyl ester, and a methacrylic acid alkoxyalkyl ester. The term "(meth)acrylic acid ester" as used herein means "acrylic acid ester and/or methacrylic acid ester." The acrylic polymer is not particularly limited, but a copolymer of a methacrylic acid alkyl ester and an acrylic acid alkyl ester (methacrylic acid alkyl ester/acrylic acid alkyl ester copolymer) is preferred. When a copolymer of a methacrylic acid alkyl ester and an acrylic acid alkyl ester is used as the acrylic polymer, the uniformity of bubbles (cells) in the foamed vinyl chloride resin molded sheet (Y) is further improved, so that the hardness of the obtained surface skin can be further lowered to thereby further improve the cushioning property.

The acrylic polymer can be prepared by carrying out a polymerization reaction using a monomer composition C containing a (meth)acrylic acid ester and optional other compound(s) as monomers.

Examples of (meth)acrylic acid ester monomers which may be used for preparing the acrylic polymer include acrylic acid alkyl esters such as methyl acrylate, ethyl acrylate, n-propyl acrylate, isopropyl acrylate, n-butyl acrylate, t-butylacrylate, pentyl acrylate, hexyl acrylate, heptyl acrylate, octyl acrylate, and 2-ethylhexyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, and 2-ethylhexyl methacrylate. One type alone or two or more types may be used in combination as such (meth)acrylic acid ester monomers. Preferred are methyl acrylate, ethyl acrylate, n-butyl acrylate, 2-ethylhexyl acrylate, methyl methacrylate, ethyl methacrylate, n-butyl methacrylate, and 2-ethylhexyl methacrylate.

The proportion of the (meth)acrylic acid ester monomer in total monomers in the monomer composition C is preferably 50% by mass or more and 95% by mass or less. When the proportion of the (meth)acrylic acid ester monomer in total monomers in the monomer composition is not less than the above lower limit, the uniformity of bubbles (cells) in the foamed vinyl chloride resin molded sheet (Y) is further improved, so that the hardness of the obtained surface skin can be further lowered to thereby further improve the cushioning property. On the other hand, when the proportion of the (meth)acrylic acid ester monomer in total monomers in the monomer composition is not greater than the above upper limit, the acrylic polymer can be prevented from being fused by heat or the like.

Monomers other than (meth)acrylic acid esters, which may be included in the monomer composition C, are not particularly limited and examples thereof include ethylenically unsaturated carboxylic acid monomers and α,β-unsaturated nitrile monomers.

As ethylenically unsaturated carboxylic acid monomers, at least one of ethylenically unsaturated carboxylic acids and salts thereof can be used. Examples of ethylenically unsaturated carboxylic acids include ethylenically unsaturated monocarboxylic acids and derivatives thereof, ethylenically unsaturated dicarboxylic acids and acid anhydrides thereof, and derivatives thereof. Examples of ethylenically unsaturated carboxylic acid salts include sodium, potassium, and lithium salts of ethylenically unsaturated carboxylic acids.

One type alone or two or more types may be used in combination at any desired ratio as ethylenically unsaturated carboxylic acids and salts thereof.

Examples of ethylenically unsaturated monocarboxylic acids include acrylic acid, methacrylic acid, and crotonic acid. Examples of derivatives of ethylenically unsaturated monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids include maleic acid, fumaric acid, and itaconic acid. Examples of acid anhydrides of ethylenically unsaturated dicarboxylic acids include maleic anhydride, diacrylic anhydride, methyl maleic anhydride, and dimethyl maleic anhydride. Examples of derivatives of ethylenically unsaturated dicarboxylic acids include methylmaleic acid, dimethylmaleic acid, phenylmaleic acid, chloromaleic acid, dichloromaleic acid, and fluoromaleic acid.

Examples of α,β-unsaturated nitrile monomers include acrylonitrile and methacrylonitrile. One type alone or two or more types may be used in combination.

Commercially available acrylic polymers can also be used. In particular, as a copolymer of a methacrylic acid alkyl ester and an acrylic acid alkyl ester, "METABLEN L-1000" (Mitsubishi Chemical Corporation) can be suitably used.

The amount of the acrylic polymer in the foamable vinyl chloride resin composition (B) is preferably 0.01 parts by mass or more per 100 parts by mass of the vinyl chloride resin, more preferably 0.09 parts by mass or more, and still more preferably 0.2 parts by mass or more, but preferably 1 part by mass or less, and more preferably 0.5 parts by mass or less. When the amount of the acrylic polymer falls within the above predetermined range, the uniformity of bubbles (cells) in the foamed vinyl chloride resin molded sheet (Y) is further improved, so that the hardness of the obtained surface skin can be further lowered to thereby further improve the cushioning property.

[Method of Preparing Foamable Vinyl Chloride Resin Composition (B)]

Methods of preparing the foamable vinyl chloride resin composition (B) are not particularly limited. The foamable vinyl chloride resin composition (B) can be prepared by mixing the components described above.

Methods of mixing the vinyl chloride resin and the foaming agent optionally with the acrylic polymer, a plasticizer and various other additives are not particularly limited. An exemplary mixing method involves mixing the components, other than the dusting agent containing vinyl chloride resin fine particles and the foaming agent, by dry blending, followed by addition and mixing of the dusting agent and foaming agent. Dry blending is preferably carried out using HENSCHEL MIXER. The temperature during dry blending is not limited but is preferably 50° C. or higher, and more preferably 70° C. or higher, but preferably 200° C. or lower. The temperature at which the foaming agent is added can be appropriately determined depending on the type of the foaming agent to be used such that a desired effect of the present disclosure can be obtained.

(Method of Producing Surface Skin)

The presently disclosed method of producing a surface skin is a method of producing a surface skin that has the vinyl chloride resin molded sheet (X) and the foamed vinyl chloride resin molded sheet (Y). The method comprises: a first step of forming the vinyl chloride resin molded sheet (X) using the vinyl chloride resin composition (A) containing a vinyl chloride resin and a plasticizer; and a second step of forming, using the foamable vinyl chloride resin composition (B), the foamed vinyl chloride resin molded sheet (Y) on one side in the thickness direction of the vinyl chloride resin molded sheet (X), wherein the amount of the plasticizer in the vinyl chloride resin composition (A) is 50 parts by mass or more per 100 parts by mass of the vinyl chloride resin. With the presently disclosed production method, it is possible to produce a surface skin which can favorably reduce thermal shrinkage when it is used after lined with a foamed polyurethane molded product.

<First Step>

In the first step, a vinyl chloride resin molded sheet (X) is formed using a vinyl chloride resin composition (A) containing a vinyl chloride resin and a predetermined amount of a plasticizer. Usually, the vinyl chloride resin composition (A) is shaped into sheet form by molding methods known in the art to form the vinyl chloride resin molded sheet (X).

The vinyl chloride resin composition (A) can be the one described in the section titled "Surface Skin" above, which is used to form the vinyl chloride resin molded sheet (X).

The molding method is preferably powder molding, and more preferably powder slush molding.

The mold temperature during powder slush molding is not particularly limited but it is preferably 200° C. or higher, and more preferably 220° C. or higher, but preferably 300° C. or lower, and more preferably 280° C. or lower.

Methods of producing the vinyl chloride resin molded sheet (X) are not particularly limited and the following method can be used, for example. Specifically, the vinyl chloride resin composition (A) is dropped onto a mold having a temperature that falls within the range described above and is left for 5 seconds or more and 30 seconds or less. An excess of the vinyl chloride resin composition (A) is shaken off and the remaining vinyl chloride resin composition (A) is left on the mold for 30 seconds or more and 3 minutes or less at an arbitrary temperature. Thereafter, depending on the mode of the second step described later, the obtained vinyl chloride molded resin sheet (X) may be removed from the mold by cooling the mold to 10° C. or more and 60° C. or less, or may not be removed from the mold. The vinyl chloride resin molded sheet removed from the mold is obtained for example as a sheet-shaped molded product with a shape corresponding to the contour of the mold.

<Step 2>

In the step 2, a foamed vinyl chloride resin molded sheet (Y) is formed on one side in the thickness direction of the vinyl chloride resin molded sheet (X) using a foamable vinyl chloride resin composition (B).

The foamable vinyl chloride resin composition (B) can be the one described in the section titled "Surface Skin" above, which is used to form the foamed vinyl chloride resin molded sheet (Y).

Methods of forming the foamed vinyl chloride resin molded sheet (Y) on one side in the thickness direction of the vinyl chloride resin molded sheet (X) using the foamable vinyl chloride resin composition (B) are not particularly limited. For example, known molding methods described above in the section titled "First Step" may be used to shape the foamable vinyl chloride resin composition (B) into sheet form while foaming the composition to produce an individual foamed vinyl chloride resin molded sheet (Y), followed by bonding of the foamed vinyl chloride resin molded sheet (Y) to one side in the thickness direction of the vinyl chloride resin molded sheet (X) by bonding methods known in the art. Alternatively, the following method can be used in which powder slush molding as the first step and powder slush molding as the second step are carried out sequentially using the same mold (hereinafter also referred to as "double slush molding").

Specifically, in powder slush molding as the first step, an excess of the vinyl chloride resin composition (A) is shaken off the mold and the remaining vinyl chloride resin composition (A) is left on the mold for 30 seconds or more and 3 minutes or less at an arbitrary temperature. Thereafter, without removing the obtained vinyl chloride resin molded sheet (X) from the mold, as the second step, a powder of the foamable vinyl chloride resin composition (B) is dropped onto the mold having the vinyl chloride resin molded sheet (X) attached, allowing the foamable vinyl chloride resin composition (B) to foam. The temperature of the mold onto which the powder of the foamable vinyl chloride resin composition (B) is dropped is not particularly limited, but is preferably 200° C. or higher, and more preferably 220° C. or higher, but preferably 300° C. or lower, and more preferably 280° C. or lower. After leaving the foamable vinyl chloride resin composition (B) onto the mold for 5 seconds or more and 30 seconds or less, an excess of the foamable vinyl chloride resin composition (B) is shaken off, and the remaining foamable vinyl chloride resin composition (B) is left onto the mold for 30 seconds or more and 3 minutes or less at an arbitrary temperature. Thereafter, the mold is cooled to 10° C. or higher and 60° C. or lower, and the obtained surface skin is removed from the mold. The surface skin removed from the mold includes the foamed vinyl chloride resin molded sheet (Y) disposed on one side in the thickness direction of the vinyl chloride resin molded sheet (X). In the example of the production method, the obtained surface skin is a sheet-shaped, two-layered molded product having a shape corresponding to the contour of the mold as a whole. By sequentially performing powder slush molding twice using the same mold as the first and second steps of the presently disclosed surface skin production method as described above, it is possible to efficiently produce a surface skin which can favorably reduce thermal shrinkage when it is used after lined with a foamed polyurethane molded product.

The presently disclosed method of producing a surface skin is not limited to the specific example described above in which the foamed vinyl chloride resin molded sheet (Y) is directly bonded to a surface on one side in the thickness direction of the vinyl chloride resin molded sheet (X). For example, when the presently disclosed production method includes optional step(s) other than the first and second steps described above, it is possible to produce a surface skin in which the vinyl chloride resin molded sheet (X) and the foamed vinyl chloride resin molded sheet (Y) are bonded together with other resin or other layer(s) interposed therebetween.

(Laminate)

The presently disclosed laminate has a foamed polyurethane molded product and the surface skin described above. The presently disclosed laminate has a structure in which the foamed vinyl chloride resin molded sheet (Y) is disposed between the foamed polyurethane molded product and the vinyl chloride resin molded sheet (X). Usually, the surface skin is lined with the foamed polyurethane molded product on the foamed vinyl chloride resin molded sheet (Y) side, so that the foamed polyurethane molded product and the surface skin are adjacent to each other in the lamination direction (i.e., the foamed polyurethane molded product and the vinyl chloride resin molded sheet (X) are laminated on top of each other with the foamed vinyl chloride resin molded sheet (Y) interposed therebetween). Because the presently disclosed laminate includes the foamed vinyl chloride resin molded sheet (Y) interposed between the foamed polyurethane molded product and the vinyl chloride resin molded sheet (X), thermal shrinkage can be favorably reduced. Thus, the presently disclosed laminate is suitably used as an automobile interior material of an automobile interior component such as an automobile instrument panel and a door trim, and is particularly suitably used for an automobile instrument panel.

Methods of lamination are not particularly limited. Lamination can be accomplished for example by the method described below. Specifically, a foamed polyurethane molded product is directly formed on the surface skin by polymerizing, for example, an isocyanate and a polyol—source materials of the foamed polyurethane molded product—on the surface of the surface skin on which the foamed vinyl chloride resin molded sheet (Y) is disposed while foaming the resulting polyurethane by methods known in the art.

EXAMPLES

The following provides a more specific explanation of the present disclosure based on Examples, which however shall not be construed as limiting the scope of the present disclosure. In the following description "%" and "part" used in expressing quantities are by mass unless otherwise specified.

The expansion ratio of the foamable vinyl chloride resin composition (B); the specific gravity and cell state of the foamed vinyl chloride resin molded sheet (Y); the thicknesses of the vinyl chloride resin molded sheet (X) and the foamed vinyl chloride resin molded sheet (Y); and the hardness and thermal shrinkage resistance rate of the laminate were measured or evaluated by the methods described below.

<Specific Gravity and Expansion Ratio>

By collecting gas over water as defined in ISO 1183, the specific gravity of the vinyl chloride resin molded sheet (Y) obtained in each Production Example and the specific gravity of the non-foamed vinyl chloride resin molded sheet obtained in Comparative Production Example 1 were measured. The expansion ratio of the foamable vinyl chloride resin composition (B) used in each Production Example was calculated using the following equation:

Expansion ratio=specific gravity measured in Comparative Production Example 1 divided by specific gravity measured in Production Example.

<Cell State>

A cross-section of the foamed vinyl chloride resin molded sheet (Y) was visually observed with an optical microscope and the state of cells was evaluated based on the following criteria:

A: Cells were uniform with a diameter of less than 150 μm.

B: Some coarse cells with a diameter of 150 μm or more were observed

C: Many coarse cells with a diameter of 150 μm or more were observed.

<Thickness>

Thickness was measured by observing a cross-section of the vinyl chloride resin molded sheet (X) or the foamed vinyl chloride resin molded sheet (Y) with an optical microscope.

<Hardness>

Hardness A as defined in JIS K-6253 (1997) was measured for the laminate.

<Thermal Shrinkage Resistance Rate>

Four marks were provided at equal distances on the laminate in each of the longitudinal and lateral directions and the intervals between the marks were measured using a long caliper (long-type ABS DIGIMATIC CALIPER CD-60C, Mitutoyo Corporation). Subsequently, as an accelerated test under the assumption of a long-term use, the laminate was stored in a gear oven ("Gear Oven", Toyo Seiki Seisaku-Sho, Ltd.) at 110° C., the heated laminate was taken out from the oven after 1,000 hours, and the intervals of the marks provided on the laminate in each direction were measured using the long caliper. For each direction, an average of the measured intervals of the marks was calculated, and a thermal shrinkage rate was calculated using the equation given below. The smaller the value of thermal shrinkage rate, the smaller the thermal shrinkage of the laminate.

Thermal shrinkage rate=(measured value before placed in the oven−measured value after heating)/measured value before placed in the oven Production Example 1

<Preparation of Foamable Vinyl Chloride Resin Composition (B)>

The compounding components shown in Table 1, excluding the plasticizer, the vinyl chloride resin fine particles as a dusting agent and the thermally decomposable foaming agent, were put into HENSCEHL MIXER and mixed. All of the plasticizer was added to the mixture at the time when the temperature of the mixture reached 80° C. By further heating the mixture, the mixture was dried up (i.e., the mixture became dry and powdery through absorption of the plasticizer by the vinyl chloride resin particles, a vinyl chloride resin). Thereafter, the vinyl chloride resin fine particles as a dusting agent were added at the time when the dried mixture was cooled to 100° C. or lower, and azodicarbonamide (volume-average particle diameter: 20 μm), a thermally decomposable foaming agent, was further added at the time when the temperature was lowered to 80° C., to prepare a foamable vinyl chloride resin composition (B).

<Formation of Foamed Vinyl Chloride Resin Molded Sheet (Y)>

The foamable vinyl chloride resin composition (B) obtained above was dropped on a textured mold heated to 250° C. and left for an arbitrary period of time of about 8 seconds to 20 seconds to melt and foam the composition. An excess of the foamable vinyl chloride resin composition (B) was then shaken off the mold. Thereafter, the textured mold on which the foamable vinyl chloride resin composition (B) had been dropped was placed in an oven set at 200° C., and the textured mold was cooled with cooling water 60 seconds after placed in the oven. At the time when the mold was cooled to 40° C., a foamed vinyl chloride resin molded sheet (Y) which is 200 mm long and 300 mm wide was removed from the mold.

In accordance with the methods described above, the thickness, specific gravity, and cell state of the obtained foamed vinyl chloride resin molded sheet (Y) were measured or evaluated. The results are shown in Table 1.

Production Examples 2 to 12

Foamable vinyl chloride resin compositions (B) and foamed vinyl chloride resin molded sheets (Y) were produced as in Production Example 1 except that the compounding components used to prepare the foamable vinyl chloride resin composition (B) were changed as shown in Table 1.

Measurements and evaluations were made as in Production Example 1. The results are shown in Table 1.

Comparative Production Example 1

A vinyl chloride resin composition and a non-foamed vinyl chloride resin molded sheet were produced as in Production Example 1 except that azodicarbonamide (volume-average particle diameter: 20 μm) as the thermally decomposable foaming agent was not used during preparation. Evaluations were made as in Production Example 1. The results are shown in Table 1.

Further, from the specific gravity of the non-foamed vinyl chloride resin molded sheet obtained in Comparative Production Example 1 and the specific gravities of the foamed vinyl chloride resin molded sheets (Y) obtained in Production Examples 1 to 12 described above, the expansion ratio of the foamable vinyl chloride resin composition (B) in each production example was calculated. The results are shown in Table 1.

Example 1

<Preparation of Vinyl Chloride Resin Composition (A)>

The compounding components shown in Table 2, excluding the plasticizer and the vinyl chloride resin fine particles as a dusting agent, were put into HENSCEHL MIXER and mixed. All of the plasticizer was added to the mixture at the time when the temperature of the mixture reached 80° C. By further heating the mixture, the mixture was dried up (i.e., the mixture became dry and powdery through absorption of the plasticizer by the vinyl chloride resin particles, a vinyl chloride resin). Thereafter, the vinyl chloride resin fine particles as a dusting agent were added at the time when the dried mixture was cooled to 100° C. or lower to prepare a vinyl chloride resin composition (A).

<Preparation of Surface Skin>

[First Step (Forming of Vinyl Chloride Molded Resin Sheet (X)]

The vinyl chloride resin composition (A) obtained above was dropped onto a textured mold heated to 250° C., molten by leaving the composition onto the mold for an arbitrary period of time of about 8 seconds to 20 seconds, and an excess of the vinyl chloride resin composition (A) was shaken off the mold. Thereafter, the textured mold onto which the vinyl chloride resin composition (A) had been dropped was placed in an oven set to 200° C. for 60 seconds.

[Second Step (Forming of Foamed Vinyl Chloride Resin Molded Sheet (Y)]

Following the first step, from above the vinyl chloride resin molded sheet (X) formed on the textured mold, the foamable vinyl chloride resin composition (B) obtained in Production Example 1 was further dropped, and molten and foamed by leaving the composition onto the mold for an arbitrary period of time of about 8 seconds to 20 seconds, and an excess of the foamable vinyl chloride resin composition (B) was shaken off the mold. The textured mold was then placed in an oven set to 200° C. and cooled with cooling water 60 seconds after placed in the oven. Once the mold was cooled to 40° C., a surface skin which is 200 mm in length and 300 mm in width was removed from the mold. The obtained surface skin was a two-layered sheet in which the foamed vinyl chloride resin molded sheet (Y) is laminated on one side in the thickness direction of the vinyl chloride resin molded sheet (X). The thicknesses of the vinyl chloride resin molded sheet (X) and the foamed vinyl chloride resin molded sheet (Y) of the surface skin were measured. The thickness of the vinyl chloride resin molded sheet (X) was 1.2 mm and the thickness of the foamed vinyl chloride resin molded sheet (Y) was 2.5 mm.

<Preparation of Laminate (Forming of Foamed Polyurethane Molded Product)>

The produced surface skin was placed in an oven set to 100° C. for 2 hours and was then spread in a mold (200 mm long, 300 mm wide, 10 mm thick), with the textured surface facing down.

Separately, 50 parts of propylene oxide (PO)-ethylene oxide (EO) block adduct of propylene glycol (hydroxyl value=28, terminal EO unit content=10%, internal EO unit content=4%), 50 parts of PO-EO block adduct of glycerol (hydroxyl value=21, terminal EO unit content=14%), 2.5 parts of water, 0.2 parts of triethylenediamine in ethylene glycol (TEDA-L33, Tosoh Corporation), 1.2 parts of triethanolamine, 0.5 parts of triethylamine, and 0.5 parts of a foam stabilizer (F-122, Shin-Etsu Chemicals, Co., Ltd.) were mixed to afford a polyol mixture. Further, a mixed solution was prepared in which the obtained polyol mixture and polymethylene polyphenylene polyisocyanate (polymeric MDI) were mixed in a ratio such that the mixed solution has an isocyanate index of 98. The prepared mixed solution was poured onto the surface skin spread inside the mold. The mold was then capped with a 348 mm×255 mm×10 mm aluminum plate to seal the mold. By allowing the mold to stand for 5 minutes after sealing, a laminate was formed in which a foamed polyurethane molded product (thickness: 6.7 mm) is laminated on the foamed vinyl chloride resin sheet (Y) side of the surface skin, i.e., the foamed vinyl chloride resin sheet (Y) is lined with a foamed polyurethane molded product.

The laminate thus formed was then removed from the mold and the hardness and thermal shrinkage resistance rate of the laminate were measured in accordance with the methods described above. The results are shown in Table 1.

Examples 2 and 3

Surface skins and laminates were produced as in Example 1 except that the foamable vinyl chloride resin composition (B) obtained in Production Example 5 was used in Example 2 and the foamable vinyl chloride resin composition (B) obtained in Production Example 9 was used in Example 3 in the second step (forming of the foamed vinyl chloride resin molded sheet (Y)) in the surface skin production. Measurements were then made as in Example 1. The results are shown in Table 1.

Comparative Example 1

A surface skin and a laminate were produced as in Example 1 except that the second step (forming of the foamed vinyl chloride resin molded sheet (Y)) in the surface skin production was not performed and the obtained vinyl chloride resin molded sheet (X) alone was used as the surface skin in the laminate production. Measurements were made as in Example 1. The results are shown in Table 1.

TABLE 1

| | | | | Comparative Production Example 1 | Production Example 1 | Production Example 2 | Production Example 3 | Production Example 4 |
|---|---|---|---|---|---|---|---|---|
| Foamable vinyl chloride resin composition (B) | Vinyl chloride resin | Base material | Vinyl chloride resin particles[1] [parts by mass] | 100 | 100 | 100 | 100 | 100 |
| | | Dusting agent | Vinyl chloride resin fine particles[2] [parts by mass] | 16 | 16 | 16 | 16 | 16 |
| | Plasticizer | | Trimellitic acid ester[3] [parts by mass] | 100 | 100 | 100 | 100 | 100 |
| | | | Epoxidized soybean oil[4] [parts by mass] | 5 | 5 | 5 | 5 | 5 |
| | Stabilizer | | Perchloric acid-treated hydrotalcite[5] [parts by mass] | 2.7 | 2.7 | 2.7 | 2.7 | 2.7 |
| | | | Zeorite[6] [parts by mass] | 1.5 | 1.5 | 1.5 | 1.5 | 1.5 |
| | | | β-Diketone[7] [parts by mass] | 0.3 | 0.3 | 0.3 | 0.3 | 0.3 |
| | | | Zinc stearate[8] [parts by mass] | 0.12 | 0.12 | 0.12 | 0.12 | 0.12 |
| | | | Hindered amine light stabilizer[9] [parts by mass] | 0.2 | 0.2 | 0.2 | 0.2 | 0.2 |
| | | | Phosphite[10] [parts by mass] | 0.3 | 0.3 | 0.3 | 0.3 | 0.3 |
| | Mold release agent | | 12-Hydroxystearic acid[11] [parts by mass] | 0.3 | 0.3 | 0.3 | 0.3 | 0.3 |
| | Thermally decomposable foaming agent | | Azodicarbonamide (volume-average particle diameter: 20 μm)[12] [parts by mass] | — | 3 | — | — | — |
| | | | Azodicarbonamide (volume-average particle diameter: 5 μm)[13] [parts by mass] | — | — | 3 | — | — |
| | | | Azodicarbonamide (volume-average particle diameter: 3 μm)[14] [parts by mass] | — | — | — | 1 | 2 |
| | Acrylic polymer | | Methacrylic acid alkyl ester/acrylic acid alkyl ester copolymer[15] [parts by mass] | — | — | — | — | — |
| | Other additive | | Carbon black pigment[16] [parts by mass] | 3.70 | 3.70 | 3.70 | 3.70 | 3.70 |
| Evaluations | Thickness (mm) | | | 1.2 | 2.5 | 3.0 | 2.8 | — |
| | Specific gravity | | | 1.16 | 0.51 | 0.45 | 0.67 | 0.43 |
| | Expansion ratio (Specific gravity in Comparative Production Example 1 divided by specific gravity in Production Example) | | | 1.0 | 2.3 | 2.6 | 1.7 | 2.7 |
| | Cell state | | | — | C | C | B | C |

TABLE 1-continued

| | | | | Production Example 5 | Production Example 6 | Production Example 7 | Production Example 8 | Production Example 9 |
|---|---|---|---|---|---|---|---|---|
| Foamable vinyl chloride resin composition (B) | Vinyl chloride resin | Base material | Vinyl chloride resin particles[1] [parts by mass] | 100 | 100 | 100 | 100 | 100 |
| | | Dusting agent | Vinyl chloride resin fine particles[2] [parts by mass] | 16 | 16 | 16 | 16 | 16 |
| | Plasticizer | | Trimellitic acid ester[3] [parts by mass] | 100 | 100 | 100 | 100 | 100 |
| | | | Epoxidized soybean oil[4] [parts by mass] | 5 | 5 | 5 | 5 | 5 |
| | Stabilizer | | Perchloric acid-treated hydrotalcite[5] [parts by mass] | 2.7 | 2.7 | 2.7 | 2.7 | 2.7 |
| | | | Zeorite[6] [parts by mass] | 1.5 | 1.5 | 1.5 | 1.5 | 1.5 |
| | | | β-Diketone[7] [parts by mass] | 0.3 | 0.3 | 0.3 | 0.3 | 0.3 |
| | | | Zinc stearate[8] [parts by mass] | 0.12 | 0.12 | 0.12 | 0.12 | 0.12 |
| | | | Hindered amine light stabilizer[9] [parts by mass] | 0.2 | 0.2 | 0.2 | 0.2 | 0.2 |
| | | | Phosphite[10] [parts by mass] | 0.3 | 0.3 | 0.3 | 0.3 | 0.3 |
| | Mold release agent | | 12-Hydroxystearic acid[11] [parts by mass] | 0.3 | 0.3 | 0.3 | 0.3 | 0.3 |
| | Thermally decomposable foaming agent | | Azodicarbonamide (volume-average particle diameter: 20 μm)[12] [parts by mass] | — | — | — | — | — |
| | | | Azodicarbonamide (volume-average particle diameter: 5 μm)[13] [parts by mass] | — | — | — | — | — |
| | | | Azodicarbonamide (volume-average particle diameter: 3 μm)[14] [parts by mass] | 3 | 3.5 | 1 | 2 | 3 |
| | Acrylic polymer | | Methacrylic acid alkyl ester/acrylic acid alkyl ester copolymer[15] [parts by mass] | — | — | 0.3 | 0.3 | 0.3 |
| | Other additive | | Carbon black pigment[16] [parts by mass] | 3.70 | 3.70 | 3.70 | 3.70 | 3.70 |
| Evaluations | Thickness (mm) | | | 3.6 | — | — | — | 3.7 |
| | Specific gravity | | | 0.35 | 0.34 | 0.67 | 0.43 | 0.30 |
| | Expansion ratio (Specific gravity in Comparative Production Example 1 divided by specific gravity in Production Example) | | | 3.3 | 3.4 | 1.7 | 2.7 | 3.9 |
| | Cell state | | | C | C | A | A | A |

| | | | | Production Example 10 | Production Example 11 | Production Example 12 |
|---|---|---|---|---|---|---|
| Foamable vinyl chloride resin composition (B) | Vinyl chloride resin | Base material | Vinyl chloride resin particles[1] [parts by mass] | 100 | 100 | 100 |
| | | Dusting agent | Vinyl chloride resin fine particles[2] [parts by mass] | 16 | 16 | 16 |
| | Plasticizer | | Trimellitic acid ester[3] [parts by mass] | 100 | 100 | 100 |
| | | | Epoxidized soybean oil[4] [parts by mass] | 5 | 5 | 5 |
| | Stabilizer | | Perchloric acid-treated hydrotalcite[5] [parts by mass] | 2.7 | 2.7 | 2.7 |
| | | | Zeorite[6] [parts by mass] | 1.5 | 1.5 | 1.5 |
| | | | β-Diketone[7] [parts by mass] | 0.3 | 0.3 | 0.3 |
| | | | Zinc stearate[8] [parts by mass] | 0.12 | 0.12 | 0.12 |
| | | | Hindered amine light stabilizer[9] [parts by mass] | 0.2 | 0.2 | 0.2 |
| | | | Phosphite[10] [parts by mass] | 0.3 | 0.3 | 0.3 |
| | Mold release agent | | 12-Hydroxystearic acid[11] [parts by mass] | 0.3 | 0.3 | 0.3 |
| | Thermally decomposable foaming agent | | Azodicarbonamide (volume-average particle diameter: 20 μm)[12] [parts by mass] | — | — | — |
| | | | Azodicarbonamide (volume-average particle diameter: 5 μm)[13] [parts by mass] | — | — | — |
| | | | Azodicarbonamide (volume-average particle diameter: 3 μm)[14] [parts by mass] | 3 | 3 | 3 |
| | Acrylic polymer | | Methacrylic acid alkyl ester/acrylic acid alkyl ester copolymer[15] [parts by mass] | 0.1 | 0.5 | 1 |
| | Other additive | | Carbon black pigment[16] [parts by mass] | 3.70 | 3.70 | 3.70 |
| Evaluations | Thickness (mm) | | | 3.6 | 3.5 | 3.6 |
| | Specific gravity | | | 0.33 | 0.32 | 0.31 |
| | Expansion ratio (Specific gravity in Comparative Production Example 1 divided by specific gravity in Production Example) | | | 3.5 | 3.6 | 3.7 |
| | Cell state | | | B | A | A |

TABLE 2

| | | | | Comparative Example 1 | Example 1 | Example 2 | Example 3 |
|---|---|---|---|---|---|---|---|
| Vinyl chloride resin molded sheet (X) | Vinyl chloride resin composition (A) | Vinyl chloride resin | Base material | Vinyl chloride resin particles[1] [parts by mass] | 100 | 100 | 100 | 100 |
| | | | Dusting agent | Vinyl chloride resin fine particles[2] [parts by mass] | 16 | 16 | 16 | 16 |
| | | Plasticizer | | Trimellitic acid ester[3] [parts by mass] | 85 | 85 | 85 | 85 |
| | | | | Epoxidized soybean oil[4] [parts by mass] | 1 | 1 | 1 | 1 |
| | | Stabilizer | | Perchloric acid-treated hydrotalcite[5] [parts by mass] | 2.7 | 2.7 | 2.7 | 2.7 |
| | | | | Zeorite[6] [parts by mass] | 1.5 | 1.5 | 1.5 | 1.5 |

TABLE 2-continued

|  |  |  |  | Comparative Example 1 | Example 1 | Example 2 | Example 3 |
|---|---|---|---|---|---|---|---|
|  |  |  | β-Diketone[7] [parts by mass] | 0.3 | 0.3 | 0.3 | 0.3 |
|  |  |  | Zinc stearate[8] [parts by mass] | 0.12 | 0.12 | 0.12 | 0.12 |
|  |  |  | Hindered amine light stabilizer[9] [parts by mass] | 0.2 | 0.2 | 0.2 | 0.2 |
|  |  |  | Phosphite[10] [parts by mass] | 0.3 | 0.3 | 0.3 | 0.3 |
|  |  | Mold release agent | 12-Hydroxystearic acid[11] [parts by mass] | 0.3 | 0.3 | 0.3 | 0.3 |
|  |  | Other additive | Carbon black pigment[16] [parts by mass] | 3.70 | 3.70 | 3.70 | 3.70 |
|  | Thickness (mm) of vinyl chloride resin molded sheet (X) |  |  | 1.2 | 1.2 | 1.2 | 1.2 |
| Foamed vinyl chloride resin molded sheet (Y) | Foamable vinyl chloride resin composition (B) | Vinyl chloride resin Base material | Vinyl chloride resin particles[1] [parts by mass] | — | 100 | 100 | 100 |
|  |  | Dusting agent | Vinyl chloride resin fine particles[2] [parts by mass] | — | 16 | 16 | 16 |
|  |  | Plasticizer | Trimellitic acid ester[3] [parts by mass] | — | 100 | 100 | 100 |
|  |  |  | Epoxidized soybean oil[4] [parts by mass] | — | 5 | 5 | 5 |
|  |  | Stabilizer | Perchloric acid-treated hydrotalcite[5] [parts by mass] | — | 2.7 | 2.7 | 2.7 |
|  |  |  | Zeorite[6] [parts by mass] | — | 1.5 | 1.5 | 1.5 |
|  |  |  | β-Diketone[7] [parts by mass] | — | 0.3 | 0.3 | 0.3 |
|  |  |  | Zinc stearate[8] [parts by mass] | — | 0.12 | 0.12 | 0.12 |
|  |  |  | Hindered amine light stabilizer[9] [parts by mass] | — | 0.2 | 0.2 | 0.2 |
|  |  |  | Phosphite[10] [parts by mass] | — | 0.3 | 0.3 | 0.3 |
|  |  | Mold release agent | 12-Hydroxystearic acid[11] [parts by mass] | — | 0.3 | 0.3 | 0.3 |
|  |  | Thermally decomposable foaming agent | Azodicarbonamide (volumn-average particle diameter: 20 μm)[12] [parts by mass] | — | 3 | — | — |
|  |  |  | Azodicarbonamide (volume-average particle diameter: 3 μm)[14] [parts by mass] | — | — | 3 | 3 |
|  |  | Acrylic polymer | Methacrylic acid alky esterl/acrylic acid alkyl ester copolymer[15] [parts by mass] | — | — | — | 0.3 |
|  |  | Other additive | Carbon black pigment[16] [parts by mass] | — | 3.70 | 3.70 | 3.70 |
|  | Thickness (mm) of foamed vinyl chloride resin molded sheet (Y) |  |  | — | 2.5 | 2.5 | 2.5 |
| Evaluations | Hardness of laminate |  |  | 71 | 66 | 61 | 55 |
|  | Thermal shrinkage resistance rate of laminate (1/1,000 ratio) | Longitudinal direction |  | 3.2 | 0.7 | 0.7 | 0.5 |
|  |  | Lateral direction |  | 5.1 | 0.8 | 0.8 | 0.9 |

1) ZEST® 1000Z (prepared by suspension polymerization, average degree of polymerization: 1,000, average particle diameter: 140 μm), manufactured by Shin Dai-ichi Vinyl Corporation
2) ZEST PQLTX (prepared by emulsion polymerization, average degree of polymerization: 800, average particle diameter: 1.8 μm), manufactured by Shin Dai-ichi Vinyl Corporation
3) TRIMEX N-08, manufactured by Kao Corporation
4) Adecasizer O-130S, manufactured by ADEKA Corporation
5) ALCAMIZER® 5, manufactured by Kyowa Chemical Industry Co., Ltd.
6) MIZUKALIZER DS, manufactured by Mizusawa Industrial Chemicals, Ltd.
7) Karenz DK-1, manufactured by Showa Denko K.K.
8) SAKAI SZ2000, manufactured by Sakai Chemical Industry Co., Ltd.
9) ADK TAB LA-72, manufactured by ADEKA Corporation
10) ADK STAB 522A, manufactured by ADEKA Corporation
11) ADK STAB LS-12, manufactured by ADEKA Corporation
12) "Vinyl Hall AC #4-K8" manufactured by Eiwa Chemical Ind. Co., Ltd.
13) UNIFOAM AZ VI-25, manufactured by Otsuka Chemical Co., Ltd.
14) UNIFOAM AZ VI-40, manufactured by Otsuka Chemical Co., Ltd.
15) METABLEN L-1000, manufactured by Mitsubishi Chemical Corporation
16) DA PX 1720(A) Black, manufactured by Dainichiseika Color & Chemicals Mfg. Co., Ltd.

It can be learned from Table 2 that the laminates of Examples 1 to 3 which comprise a surface skin in which a foamed vinyl chloride resin molded sheet is disposed on one side in the thickness direction of a plasticizer-containing vinyl chloride resin molded sheet can favorably reduce thermal shrinkage compared to the laminate of Comparative Example 1 in which a plasticizer-containing vinyl chloride resin molded sheet is used alone as the surface skin.

INDUSTRIAL APPLICABILITY

According to the present disclosure, it is possible to provide a surface skin which can favorably reduce the thermal shrinkage when it is used after lined with a foamed polyurethane molded product.

Further, according to the present disclosure, it is possible to provide a laminate which can favorably reduce the thermal shrinkage of a surface skin.

The invention claimed is:
1. A surface skin comprising:
a vinyl chloride resin molded sheet (X) which comprises a vinyl chloride resin and a plasticizer (a); and
a foamed vinyl chloride resin molded sheet (Y) which comprises a plasticizer (b),
wherein an amount of the plasticizer (a) contained in the vinyl chloride resin molded sheet (X) is 50 parts by mass or more per 100 parts by mass of the vinyl chloride resin,
the foamed vinyl chloride resin molded sheet (Y) is disposed on one side in a thickness direction of the vinyl chloride resin molded sheet (X),
a thickness of the foamed vinyl chloride resin molded sheet (Y) is 2.3 mm or more, the plasticizer (a) comprises a trimellitic acid ester and an epoxidized soybean oil, the plasticizer (b) comprises a trimellitic acid ester and an epoxidized soybean oil, the foamed vinyl chloride resin molded sheet (Y) comprises an acrylic polymer, and the acrylic polymer is a copolymer consisting of a methacrylic acid alkyl ester and an acrylic acid alkyl ester.

2. The surface skin according to claim 1, wherein the surface skin is for an automobile interior component.

3. A method of producing the surface skin-according to claim 1, the method comprising:

a first step of forming the vinyl chloride resin molded sheet (X) using a vinyl chloride resin composition (A) which comprises the vinyl chloride resin and the plasticizer (a); and a second step of forming the foamed vinyl chloride resin molded sheet (Y) on one side in a thickness direction of the vinyl chloride resin molded sheet (X) using a foamable vinyl chloride resin composition (B) comprising the plasticizer (b).

4. The method of producing a surface skin according to claim 3, wherein the foamable vinyl chloride resin composition (B) comprises a thermally decomposable foaming agent.

5. The method of producing a surface skin according to claim 4, wherein the thermally decomposable foaming agent comprises an azo compound.

6. The method of producing a surface skin according to claim 4, wherein the thermally decomposable foaming agent has a volume-average particle diameter of 10 µm or less.

7. A laminate comprising:

a foamed polyurethane molded product; and the surface skin according to claim 1, wherein the foamed vinyl chloride resin molded sheet (Y) is disposed between the foamed polyurethane molded product and the vinyl chloride resin molded sheet (X).

* * * * *